2,944,994
Patented July 12, 1960

United States Patent Office

2,944,994

METHOD OF MAKING TRANSPARENT UNSATURATED POLYESTER-STYRENE-GLASS FIBER COMPOSITION

Fred G. Singleton, Pittsburgh, and Kenneth A. Schafer, Verona, Pa., assignors to H. H. Robertson Company, Pittsburgh, Pa., a corporation of Pennsylvania Filed July 7, 1954, Ser. No. 441,844

1 Claim. (Cl. 260—40)

This invention relates to a reinforced plastic material.

One object of the invention is to provide a novel fiber reinforced plastic material which possesses characteristics rendering it more suitable for various commercial purposes than comparable reinforced plastic materials of the prior art.

A further object of the invention is to provide an improved fiber reinforced plastic material having superior light transmitting characteristics which substantially increases the utility of the reinforced plastic material for many commercial purposes.

A still further object of the invention is to provide a translucent plastic sheet embodying reinforcing fibers of glass and possessing superior light transmitting characteristics.

Another object of the invention is to provide a novel, practical and simple method of making a reinforced plastic material embodying the invention.

With these general objects in view and such others as may hereinafter appear, the invention consists in the various novel reinforced plastic products, in the improved light transmitting reinforced plastic sheets embodying glass and other reinforcing fibers, and in the methods of making all such products and sheets, hereinafter described and particularly defined in the claims at the end of this specification.

Figure 1:
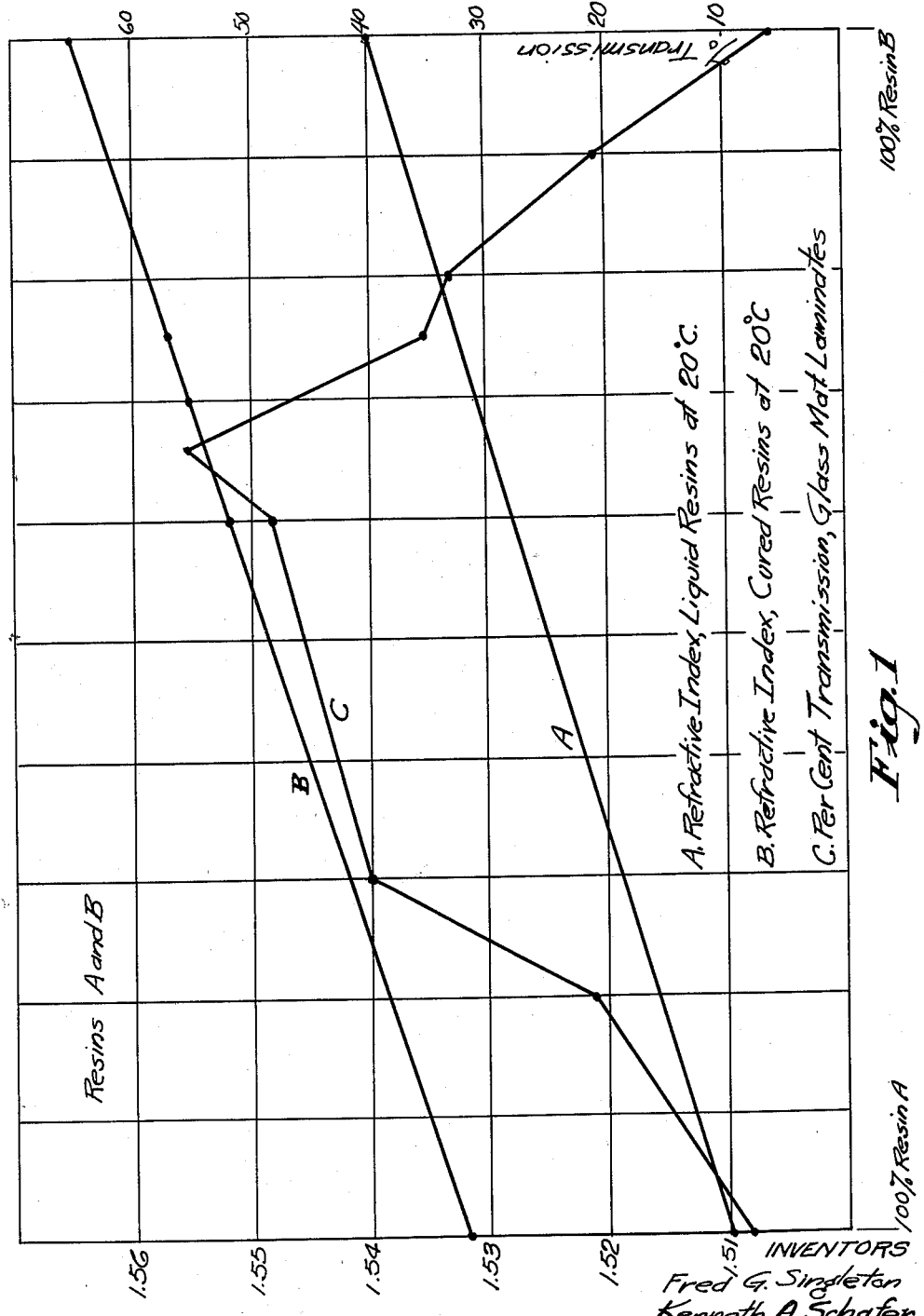
Figure 2:
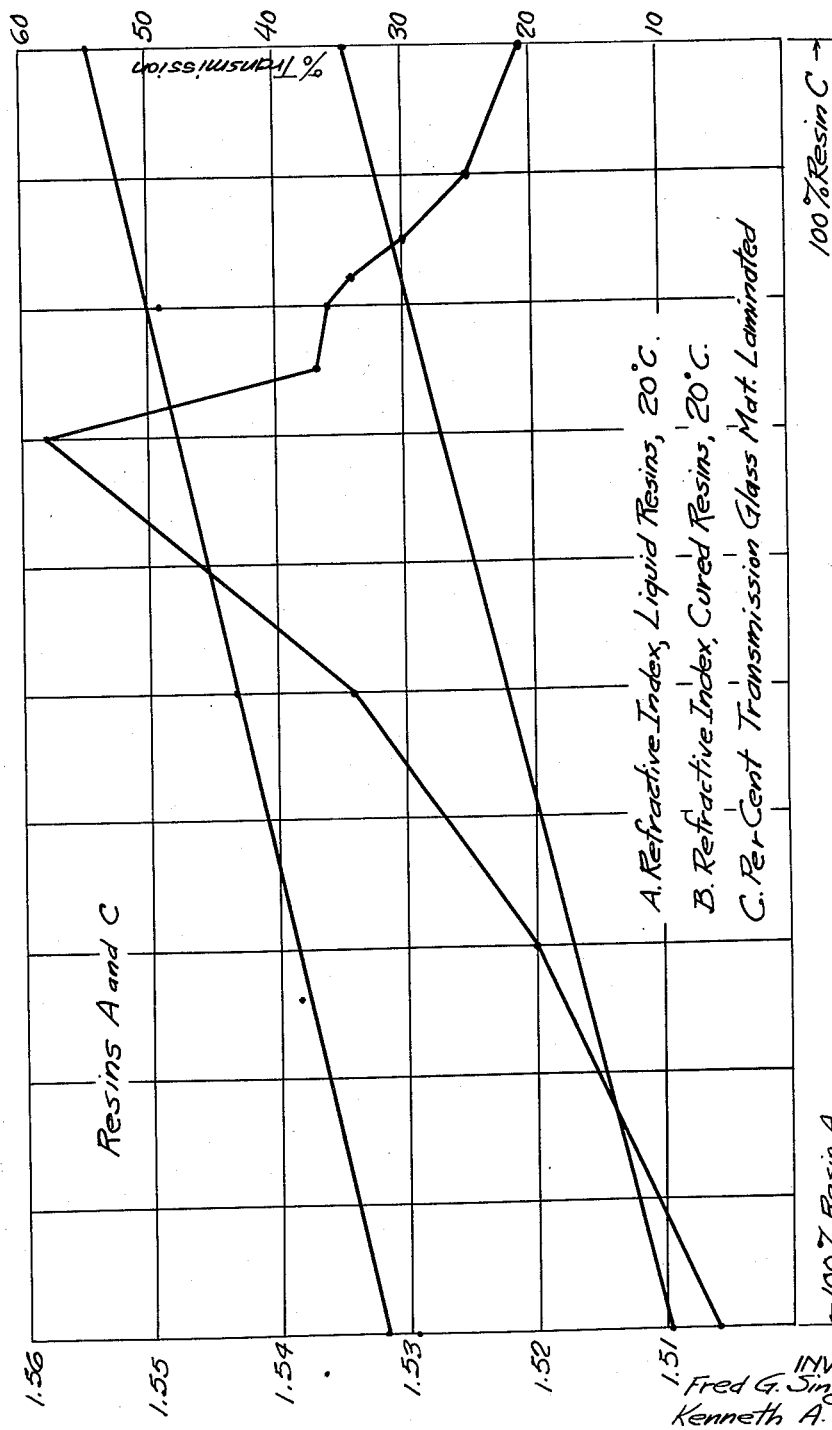

In the drawings Figs. 1 and 2 illustrate in graphic form the results of tests showing the relation between the refractive indexes of thermosetting resins which may be used in producing the present fiber reinforced plastic sheets in their uncured liquid state and in their cured state, together with the results of light transmission tests of the fiber reinforced plastic sheets in their cured state, all as will be hereinafter referred to.

As used throughout the following specification and in the claims the term "plastic" is intended to define and include a thermosetting resin, illustrative examples of which will be hereinafter set forth.

The use of translucent sheets, rods and other products embodying a plastic base and fiber reinforcement, and particularly glass fiber reinforcement has greatly increased in the last few years. The utility of the present invention is particularly apparent when applied to or embodied in a translucent sheet embodying a plastic base and glass reinforcing fibers. At the present time a large volume of such translucent sheets are used in the building and other industries, and when sufficient density of reinforcing fibers are embedded in the plastic base to impart the desired strength to such a sheet, the ability of the sheet to transmit light therethrough leaves much to be desired. Most such commercial sheets which have been heretofore manufactured and sold have a milky appearance and are not efficient in the transmission of light therethrough. The amount of light which passes through any particular commercial form of such a translucent sheet of this character depends upon the character of the resin, the density and character of the reinforcing fibers and the thickness of the sheet.

The present invention is based upon the discovery that the visibility of the fiber reinforcement in a fiber reinforced plastic material may be substantially decreased, and conversely the light transmitting characteristics of particular types of fiber reinforced plastic material, particularly in sheet form, may be greatly increased, by the use of a resin which in its cured state has a light refractive index approaching the light refractive index of the particular reinforcing fibers embedded therein. The closer that these two light refractive indexes approach one another the less the visibility of the reinforcing fibers and the greater the light transmitting capacity of the fiber reinforced plastic sheet.

During the course of research we have discovered that the light refractive index of a thermosetting resin in its liquid uncured state differs substantially from the light refractive index of the resin in its cured state, and this we believe to be true of the different types of thermosetting resins within which glass and other fibers have or may be utilized in producing the various commercial forms of light transmitting fiber reinforced sheets and other products. We have also discovered that marked improvement in the light transmitting capacity of particular fiber reinforced plastic sheets or products may be obtained by the selection and use of a thermosetting resin material having a light refractive index in the cured state which closely approaches that of the particular fiber reinforcement to be embodied therein. Additionally, the visibility of the fibers of the fiber reinforcement of such products are greatly decreased under such circumstances.

In accordance with a more specific aspect of the invention it is preferred to utilize a thermosetting resin of the type generally referred to as an unsaturated polyester resin. This general type of resin may be produced in different forms, some of which may vary widely in their light refractive indexes, and in accordance with the invention a resin mass will be employed whose light refractive index in the cured state of the resin approaches the light refractive index of the particular fiber, such as the particular glass fiber which is to be embedded in the resin. From the results which we have obtained during our research we believe that with glass reinforcing fibers and unsaturated polyester resins it is desirable that the light refractive index of the resin material should not vary more than about .010 over or under the light refractive index of the particular glass fiber employed. In fact we prefer that these indexes should not vary from one another more than plus or minus .005.

Viewed in another aspect of the invention, we have observed during experimental work with unsaturated polyester resins and glass fiber reinforcement that the light refractive index of typical resins in passing from the liquid or uncured state to the set or cured state increases by a substantially constant increment which with the different resins with which we have experimented ranges from about 0.019 to 0.025.

Preferably, one or more unsaturated polyester resins are conjointly polymerized with one or more polymerizable monomeric solvents.

Suitable unsaturated polyesters for use in the present invention comprise reaction products produced by heating at least one dihydric alcohol with at least one dicarboxylic acid, or ester forming derivative thereof, at least one of said dicarboxylic acids being of the type usually referred to as alpha, beta-unsaturated dicarboxylic acids. Dihydric alcohols which may be used comprise ethylene glycol, propylene glycol, the butylene glycols, diethylene glycol, triethylene glycol, the polyethylene glycols, and unsaturated glycols such as, for example, vinylethylene glycol. Alpha, beta-unsaturated dicarboxylic acid materials which may be used include maleic anhydride, maleic acid, fumaric acid, citraconic anhydride, citraconic acid and itaconic acid. Although the unsaturated acid may constitute the sole acidic reactant a wide variation in the properties of the polymerized resins is obtainable by using varying proportions of other dicarboxylic acid materials, such as phthalic acid, phthalic anhydride, and tetrachlorophthalic anhydride, as well as the straight chain aliphatic dicarboxylic acids, such as succinic, adipic, azelaic and sebacic acids. The ester forming dicarboxylic acid materials may include dicarboxylic acids and the anhydrides, esters and acid halides thereof, all of which are ester forming.

While resins made from aliphatic alpha, beta-unsaturated dicarboxylic acids and dihydric alcohols are preferred for most purposes, reactants of higher functionality, such as glycerol and citric acid may be used, with the reservation that such polyfunctional reactants must not constitute a sufficiently large proportion of the total reactants to cause the resin to become insoluble before the molecular weight reaches the desired value.

It is within the scope of the present invention to use monohydric alcohols and/or monocarboxylic acids as modifiers in the preparation of the unsaturated polyesters. Unsaturated monofunctional reactants, such as allyl and crotyl alcohols and arcrylic and crotonic acids may be used. The unsaturated polyesters may be of the oil modified type.

Copolymerizable solvents suitable for use in the present invention comprise polymerizable unsaturated organic liquids which are compatible with the unsaturated polyesters defined above. Such materials include polymerizable hydrocarbons, such a styrene, dichlorostyrene, indene and the coumarone-indene fraction of coal-tar distillates; vinyl ketones; vinyl ethers; allyl esters, such as allyl maleate and allyl phthalate; esters of unsaturated acids, such as ethyl acrylate, methyl methacrylate, and ethyl crotonate; and miscellaneous other unsaturated compounds, such as acrylonitrile and acrolein. Styrene is the preferred copolymerizing solvent for use in the present invention because it ranks high in availability and low cost, and imparts desirable properties of water resistance, chemical resistance, color and physical characteristics to compositions containing it.

In order to assist in the polymerization of the unsaturated polyester and solvent an amount equal to from about one-tenth of one percent to about five percent of any of the well known chain-initiating catalysts may be used. Examples of such catalysts which have been found to be particularly adapted to use according to the present invention are aliphatic acyl peroxides, such as acetyl peroxide, lauryl peroxide and stearyl peroxide; peroxides of the aromatic acid series, such as benzoyl peroxide; peroxygen esters, such as tertiary butyl perbenzoate; and organic derivatives of hydrogen peroxide, such as tertiary butyl hydroperoxide.

The following examples will illustrate the operation of the present invention:

EXAMPLE 1

Resin A 980 grams (10 moles) maleic anhydride
1376 grams (11 moles) dipropylene glycol The reactants were placed in a 5-liter three-neck flask equipped with a mechanical agitator, an inlet tube for nitrogen gas, and means for collecting the water formed during the reaction. The temperature was raised over a period of one hour to 200° C. and was maintained at this level for an additional three hours. The product was then cooled to 80° C. and dissolved in sufficient styrene monomer to produce a solution having a viscosity of 200 centipoises at 25° C. Sufficient t-butyl catechol was added to the styrene prior to its addition to the polyester to make 300 parts per million based on the total weight of polyester and styrene.

The index of refraction of Resin A measured at 20° C. using the sodium D line was 1.5098. A casting was made from Resin A by catalyzing it with one percent of benzoyl peroxide and heating it in a glass mold. The index of refraction of the cured unreinforced material was 1.5320 when measured at 20° C. using the sodium D line.

EXAMPLE 2

Resin B 490 grams (5 moles) maleic anhydride
740 grams (5 moles) phthalic anhydride
836 grams (11 moles) propylene glycol A polyester was produced from the above materials, as was described in Example 1. This was dissolved in styrene monomer containing sufficient t-butyl catechol to make 300 parts per million based on the total weight of polyester and styrene. Sufficient styrene was used to give a resin having a viscosity of 200 centipoises at 25° C. The index of refraction of Resin B measured at 20° C. using the sodium D line is 1.5400. A cured cast sample made from Resin B by the method described above in Example 1 for Resin A had an index of refraction of 1.5645 when measured at 20° C. using the sodium D line.

EXAMPLE 3

Resin C 686 grams (7 moles) maleic anhydride
444 grams (3 moles) phthalic anhydride
836 grams (11 moles) propylene glycol Resin C was made to a viscosity of 200 centipoises at 25° C., as was described for Resin A.

The index of refraction of Resin C was found to be 1.5350 when measured at 20° C. using the sodium D line. A cured cast sample made from Resin C by the method described above in Example 1 had an index of refraction of 1.5550 when measured at 20° C. using the sodium D line.

EXAMPLE 4

A laminate was made from Resin A using the following steps:

(a) Resin A was catalyzed with one percent of benzoyl peroxide.

(b) Part of the catalyzed resin was poured onto a sheet of cellophane, and a sheet of two-ounce glass mat (Type T-216 supplied by the Owens-Corning Fiberglas Corporation to the manufacturers of translucent glass-reinforced plastic sheets) was placed on top of the resin. After allowing the glass mat to soak in the resin for a minute or two, additional resin was poured on top, and a sheet of cellophane was added. The laminate was then rolled lightly using a glass tube in order to remove as much air as possible.

(c) The laminate was then placed between the platens of a hydraulic press, and the press was closed. Spacers one-sixteenth of an inch thick were used to regulate the thickness of the laminate. The platen temperature was 220° F., and the laminate was left in the press for ten minutes.

After the laminate had cooled to room temperature it was examined visually, and it was discovered that, while it was translucent to some degree, it was impossible to distinguish the shapes of objects when looking at the objects through the laminate. Stated another way, the laminate had some degree of translucency but substantially no transparency. A light transmission test, as described elsewhere herein, showed that this laminate transmitted only eight percent of the incident light. The majority of the glass fibers were clearly visible.

EXAMPLE 5

A laminate was made from Resin B using the procedure described in Example 4. This laminate had an appearance similar to that of Example 4 except that it had a slightly bluish tint when examined against a strong light. Shapes of objects were not discernible, and a strong fiber pattern was present. The light transmission was only six percent.

EXAMPLE 6

A laminate was made from two parts by weight of Resin B and one part by weight of Resin A using the method of Example 4. This laminate had an appearance that was strikingly different from those produced from the individual resins. The light transmission was fifty-five percent. Relatively few fibers were visible, and transparency was present to the extent that objects could be clearly seen through the laminate. For example, it was possible to see the hands of a wall clock at a distance of fifteen feet with sufficient clarity to tell the time of day. When the laminates prepared from the individual resins were used in the same way it was found that it was impossible even to distinguish the outlines of the clock.

EXAMPLE 7

Several additional mixtures of Resins A and B were made, and laminates were made from them using the procedure of Example 4. Refractive indexes were run on the liquid mixtures and on cured unreinforced castings from the mixtures. Fig. 1 gives these results in graphic form together with the light transmission values determined on laminates made from the mixtures.

EXAMPLE 8

Resin D

In order to determine whether the advantages of the present invention can be realized by using a single resin rather than by mixing two resins having refractive indexes respectively higher and lower than the optimum value, Resin D was made. This one resin contains the same raw materials in the same proportions as the mixture of two parts of Resin B and one part of Resin A used in Example 6.

653 grams (6.67 moles) maleic anhydride
493 grams (3.33 moles) phthalic anhydride
557 grams (7.33 moles) propylene glycol
492 grams (3.67 moles) dipropylene glycol The polyester was made and blended to a viscosity of 200 centipoises with styrene monomer containing t-butyl catechol by the method of Example 1. The index of refraction was found to be 1.5280 when measured at 20° C. using the sodium D line.

EXAMPLE 9

A laminate was prepared from Resin D using the method of Example 4. Upon examination after cooling the laminate was found to have substantially the same degree of transparency observed in the laminate prepared from the mixture of two parts of Resin A and one part of Resin B described in Example 6. The light transmission was found to be forty-two percent.

EXAMPLE 10

One commercially available polyester resin that is sold to manufacturers of translucent reinforced plastic sheets was found to have a refractive index of 1.5450 when this property was measured at 20° C. using the sodium D line. The laminate had a very low degree of transparency and gave a light transmission value of eleven percent.

It was calculated that a mixture of fifty-six parts of this resin and forty-four parts of Resin A would have a refractive index of 1.5300. Such a mixture was prepared and it was found, in fact, to have a refractive index of 1.5295. A laminate was made from this mixture according to the method of Example 4. The laminate was found to possess a high degree of transparency. The light transmission was found to be forty-three percent.

EXAMPLE 11

A second commercially available polyester that is sold to manufacturers of translucent reinforced plastic products by a second supplier was found to have a refractive index of 1.5370 when this property was measured at 20° C. using the sodium D line. A laminate was prepared from this resin using the procedure of Example 4. The laminate had a low degree of transparency and gave a light transmission value of seventeen percent.

It was calculated that a mixture of seventy percent of this resin and thirty percent of Resin A would have a refractive index of 1.5300. Such a mixture was prepared and it was found to have a refractive index of 1.5290. A laminate was made from this resin according to the method of Example 4. The laminate was found to have a high degree of transparency. The light transmission was found to be forty-five percent.

EXAMPLE 12

A third commercially available polyester was found to have a refractive index of 1.5240 when this property was measured at 20° C. using the sodium D line. A laminate was prepared from this resin using the procedure of Example 4. The laminate had substantially no transparency and gave a light transmission value of only three percent.

It was calculated that a mixture of seventy percent of this resin and thirty percent of Resin B should have a refractive index of 1.5300. Such a mixture was prepared and it was found, in fact to have a refractive index of 1.5292. A laminate was prepared from this resin using the procedure of Example 4. The laminate was found to have a high degree of transparency. The light transmission value was found to be thirty-eight percent.

The equipment used for measuring the light transmission consisted of an enclosure four feet long, four inches wide and six inches high. A light source consisting of a flashlight was placed at one end and a photoelectric measuring instrument (the "Densichron," Welch Scientific Co.) was placed at the other end. A slotted holder was placed in the center of the box for positioning the specimens. The pointer of the light meter was adjusted to one hundred percent transmission with the specimen holder empty. The specimen was then placed in the holder and the percent transmission was read directly from the instrument. A number of variables are involved in measuring the light transmission of reinforced plastic specimens. Among these are:

(1) The nature of the light source,
(2) The reflectivity of the inner surface of the enclosure, and
(3) The size of the aperture through which the transmitted light enters the instrument.

Values for light transmission as high as ninety-two percent have been obtained on some of the improved products of the present invention by using an ordinary light bulb with no focusing lens as a light source.

The light refractive index of the fibers in commercial forms of glass fiber mat according to information furnished by one manufacturer is 1.549. This figure has been closely confirmed by our tests upon the fibers of glass fiber mat obtained from different commercial sources.

We also prefer in the manufacture of a glass fiber reinforced plastic sheet or product to incorporate a mass of glass fibers in a body of an uncured, unsaturated polyester resin having a light refractive index in its uncured state within the range of from 1.520 to 1.535 in order that when the resin is subsequently cured to a solid state, the sheet or product possesses the advantages and desirable characteristics above referred to.

We have discovered further that a resin having the desired index of refraction can be prepared by mixing two resins having refractive indexes in the cured state respectively above and below the refractive index of the reinforcing fibers. As will be shown in the examples, it is possible to calculate accurately the amount of one resin that must be added to another in order to achieve the desired index of refraction. When the indexes of refraction of a series of mixtures of two resins are plotted, a straight line results for the liquid resins. A second straight line results when the refractive indexes of the polymerized mixtures are plotted. These relationships are shown graphically in Figs. 1 and 2. In addition, if found desirable more than two such resins may be mixed in selected and in proportions which will give the desired results.

The glass used for plastic reinforcement in various forms of plastic sheets now on the market is a borosilicate crown glass containing high alumina. The approximate formulation is 55 percent $SiO_2$, 15 percent $Al_2O_3$, 21 percent CaO, and 9 percent $B_2O_3$ with minute quantities of $SO_3^-$, $F_2$, $K_2O$, and $Na_2O$.

From the description thus far it will be observed that the present invention in its preferred form contemplates a reinforced plastic product, and particularly a reinforced plastic sheet, utilizing a thermosetting resin and glass fiber as the reinforcement. In its broader aspect the invention may include the use of other suitable reinforcing fibers, such as some of the textile fibers, both in fibrous form wherein the fibers may be randomly disposed and also in the form of fabrics. In such instances the particular fiber employed depends to some extent upon the ultimate use for which the reinforced product is designed. In some instances the improved light transmitting capacity of the sheet or other product may be the controlling factor, whereas in other instances the decrease in visibility of the individual reinforcing fibers may play an important part. Among the uses where the decrease in visibility is desired may be mentioned the production of travelling bags, suitcases, and the like wherein the fibrous appearance of the reinforcing fibers is diminished to a maximum extent. Other such uses include bows and arrows, and fishing rods. While, as above indicated, it is preferred in producing sheets of the reinforced plastic to follow the procedure above outlined, nevertheless, other methods of forming sheets or other objects including extrusion processes of the reinforced fibrous resin mass may be followed, as will be apparent to one skilled in the art.

Having thus described the invention, what is claimed is:

A method of making a transparent plastic body reinforced with glass fibers, said glass fibers having a refractive index of approximately 1.549, comprising: preparing a monomeric styrene solution of an unsaturated polyester, said solution having a refractive index of approximately 1.528 measured at 20° C. using the sodium D line and a viscosity of approximately 200 centipoises, said polyester being the reaction product of the following ingredients in approximately the proportions shown:

| Ingredient: | Parts by weight |
| --- | --- |
| Maleic anhydride | 653 |
| Phthalic anhydride | 493 |
| Propylene glycol | 557 |
| Dipropylene glycol | 492 | incorporating said glass fibers in said monomeric styrene solution; and curing said solution to a solid thermoset state.

References Cited in the file of this patent

UNITED STATES PATENTS

| | | |
| --- | --- | --- |
| 2,176,837 | Ellis | Oct. 17, 1939 |
| 2,311,613 | Slayter | Feb. 16, 1943 |
| 2,491,409 | Kropa | Dec. 13, 1949 |
| 2,542,819 | Kropa | Feb. 20, 1951 |
| 2,650,184 | Biefeld | Aug. 25, 1953 |
| 2,743,309 | Lindsay | Apr. 24, 1956 |
| 2,801,919 | Eichorn | Aug. 6, 1957 |

OTHER REFERENCES

Handbook of Chemistry and Physics, 28th edition (1944), published by Chemical Rubber Publishing Co., Cleveland, Ohio, page 2145.

Wakeman: Chemistry of Commercial Plastics (1947), published by Reinhold Publishing Corp., New York, pages 503–507.

Flory: Principles of Polymer Chemistry (1953), published by Cornell Univ. Press, Ithaca, New York, page 31.